UNITED STATES PATENT OFFICE.

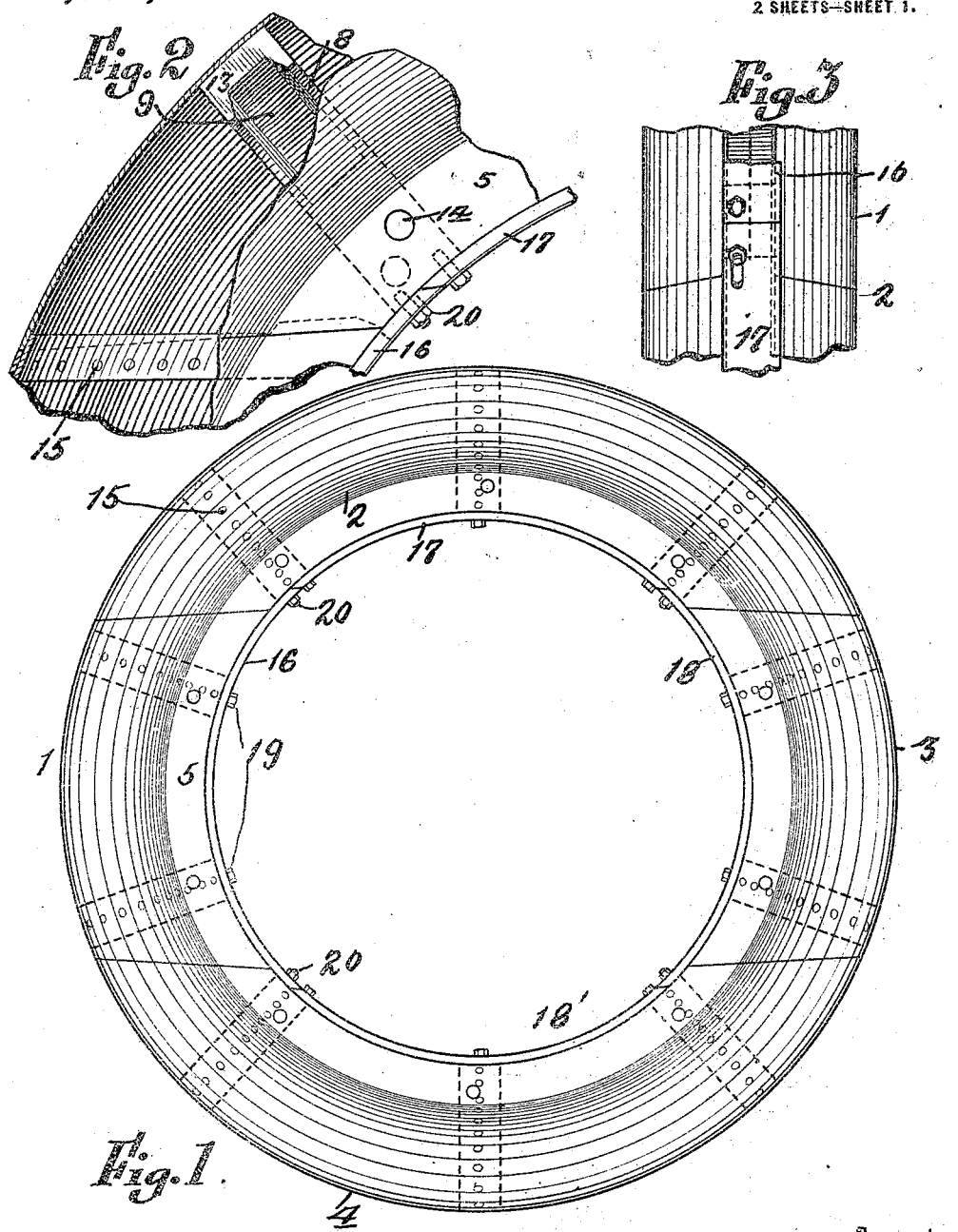

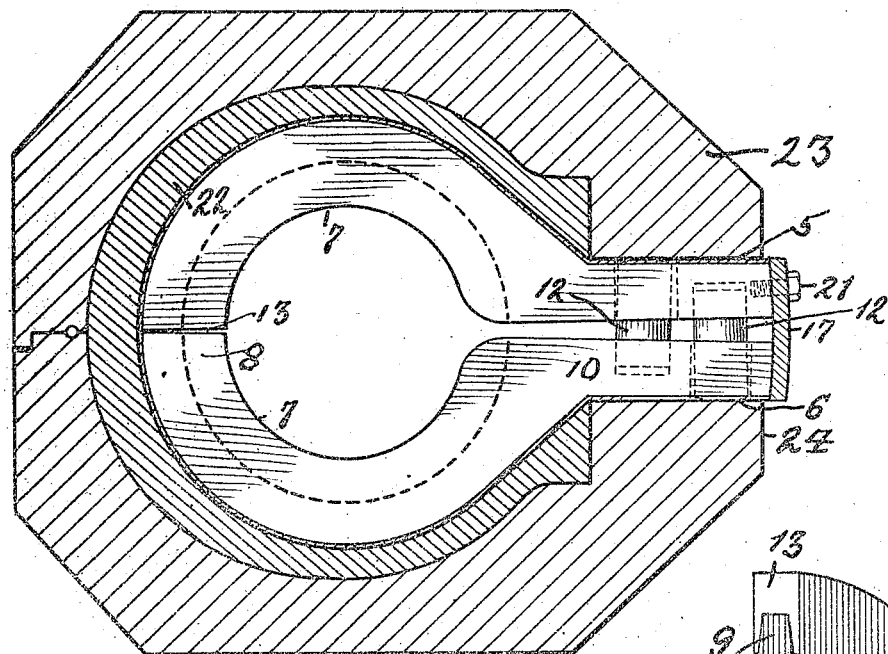
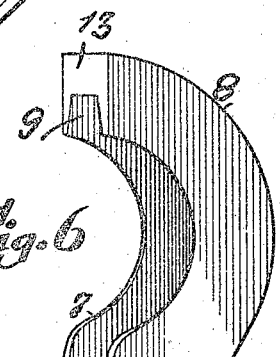
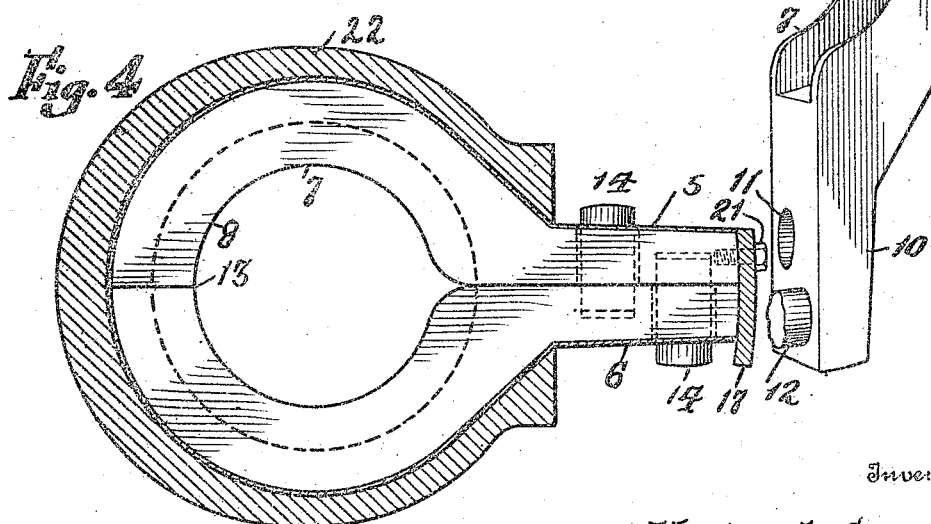

VICTOR L. COX, OF AKRON, OHIO, ASSIGNOR OF ONE-HALF TO ALOYS SCHONENBERGER, OF AKRON, OHIO.

CORE.

1,274,858.  Specification of Letters Patent.  Patented Aug. 6, 1918.

Application filed March 26, 1918. Serial No. 224,752.

*To all whom it may concern:*

Be it known that I, VICTOR L. COX, a citizen of the United States, residing at Akron, in the county of Summit and State of Ohio, have invented new and useful Improvements in Cores, of which the following is a specification.

This invention relates to cores for building the outer casings of double tube pneumatic tires. The object of the invention is to provide a light, strong and durable core on which a tire shoe may be built up and subsequently vulcanized, said core comprising a plurality of segment-shaped sections to permit the collapsing of the core after the vulcanizing of the tire shoe. The invention contemplates the formation of the core from thin sheet metal to reduce weight, the various sections being reinforced by strengthening members to thereby stiffen the entire structure, said strengthening members being arranged in pairs with the members of the pairs oppositely disposed to each other and suitably disposed with respect to the various tire sections so that sufficient strength is imparted to them to withstand the rough usage to which cores of this type are usually subjected. A further and important object of the invention is to provide means on the strengthening members which are adapted to force the inner portions of the strengthening members apart in unison with the spreading or lateral springing apart of the inner portions of the core sections to thereby stretch and smooth the fabric in the tire shoe during vulcanization to smooth out wrinkles and to better shape the shoe, the operation of spreading the inner portions of the strengthening members and the core sections taking place simultaneously with the clamping together of the mold sections, the mold sections coacting with the spreading or separating means on the strengthening elements so that as long as the mold sections are clamped together the inner portions of the entire core are sprung apart to force the tire shoe outwardly for spreading the same against the inner walls of the mold sections.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a side elevation of a core embodying the present invention.

Fig. 2 is a fragmentary sectional view enlarged of a portion of the core shown in Fig. 1.

Fig. 3 is a view of a portion of the core looking outwardly from the interior.

Fig. 4 is a transverse sectional view of a core embodying the present invention with a tire shoe thereon showing the core in its contracted condition.

Fig. 5 is a transverse sectional view of a mold with a core on which is mounted a tire shoe positioned therein with the inner portions of the core sprung apart to accomplish the function of stretching the fabric, and Fig. 6 is a perspective view of one of the strengthening members.

A core embodying the present invention comprises a plurality of sections and in the present case embodies sections 1, 2, 3 and 4 all of which are segment-shaped so that when in their assembled relation they form an annulus. In the present case sections 1 and 3 are wedge-shaped to permit their inward, easy withdrawal from the interior of the vulcanized tire shoe. Each of the sections is formed of thin sheet metal preferably either rolled or stamped and having an exterior configuration which it is desired to impart to the interior of the tire shoe. The body portion of each side of each section is carried inwardly to form flanges 5 and 6 which are spaced from each other.

In view of the fact that the various sections are formed of thin sheet it is necessary to reinforce them at suitable points and in order to do this, I employ strengthening members 7 one of which is shown in Fig. 6. Each strengthening member embodies an outer semicircularly-curved portion 8 fashioned to snugly fit the interior of a core section and provided with an inner groove 9 to reduce the weight of the entire member. The member is furthermore provided with an inwardly-extending arm 10 provided with an aperture 11 and a projecting pin 12. The pin 12 is held in position in an opening in the arm 10 against easy removal. These strengthening members are arranged in pairs with their upper faces 13 in substantial contact at the inner face of the core section opposite to the tread thereof and with the two arms thereof in parallelism and projecting inwardly toward the center of the core and so disposed that the pin 12 in one member of each pair will engage in the opening 11 of the companion member and the pin 12 of the companion member will be disposed in the opening 11 of the first member so that the pins and openings 11 in the pairs are reversely disposed. The pins 12 are of such length that when the opposing faces of the arms 10 of the strengthening members are in substantial contact the ends 14 of the pins on one member project a considerable distance beyond the outer face of the arm 10 or the companion member. The inwardly-extending flanges 5 and 6 of the sections 1, 2, 3 and 4 are adapted to overlap the lateral faces of the arms 10 and are provided with suitable openings to permit the passage therethrough of the pins 12. The strengthening members 7 are secured in position within the various cores by rivets or other suitable holding means 15.

In order to hold the various segment-shaped sections in annular formation during the building up of a tire shoe I employ a broken ring-shaped member comprising segment-shaped sections 16, 17, 18 and 18' which assembled form an annulus of proper diameter to fit within and engage the inner faces of the flanges of the body members of the core and also abut against the inner faces of the pairs of arms 10 of the strengthening members. The section 16 of the inner ring is secured to the core section 1 by bolts 19 and also by bolts 20 to the adjacent strengthening members of the core sections 2 and 4. The lines of severance between the inner ring members 16 and 17 and 18' are parallel with the lines of severance between the section 1 and the sections 2 and 4 and the segment 16 is adapted to project or overlap the strengthening members of the core sections 2 and 4 as clearly shown in Fig. 1. By making the lines of severance parallel with the lines of severance between the core sections no interference will be had in withdrawing the section 1 when the bolts 20 are removed. All of the ring sections are fixed to their respective core sections and the only temporary connections are the bolts 20 for holding the key sections in position. The description which has been given with respect to the key section 1 applies with equal force to the key section 3 and a description thereof will not be duplicated as it is not thought necessary to be repeated here. The ring sections are secured by bolts or cap screws 21 to one member of each pair of strengthening members so as to permit transverse movement of the arms 10 at the inner ends of each pair of strengthening members toward and away from each other freely.

In use a tire shoe 22 is built up on the assembled core and the core is then placed in a mold comprising two sections 23 and 24 which are clamped together in the usual manner. Previous to the clamping of the mold sections together the parts will be in substantially the position shown in Fig. 4 with the ends 14 of the pins 12 projecting transversely from the opposite faces of the arms 10 of the strengthening members and as the mold sections are clamped together they spring the two inner portions of the core apart thereby stretching and compacting the fabric of the tire carcass 22 against the inner faces of the mold sections which operation serves to make a better and more efficient tire shoe. In removing a tire shoe after vulcanization the foregoing operation is reversed. The sheet material of which the core sections is formed possesses a slight degree of resiliency at least to permit a slight springing apart of the inner ends 10 of the strengthening members 7, the material of the core body constituting a spring hinge for this purpose.

I claim,

1. A core comprising a plurality of segment-shaped sections adapted when assembled to form an annulus, said sections being of tubular formation and each side wall thereof provided with an inwardly-projecting radial flange, a plurality of pairs of strengthening members secured in the cavity of each section with the members of each pair opposite to each other and each member provided with an inwardly-extending integral arm secured to one of the flanges of the section in which it is placed, a sectional ring within said core the sections of which are secured to the inner ends of a portion of the arms of said strengthening members and adapted to hold said core sections temporarily in place, and means to separate the inner ends of said strengthening members to spring the side walls of the core sections apart during the vulcanizing operation.

2. A core comprising a plurality of segment-shaped sections adapted when assembled to form an annulus, said sections being of tubular formation and each side wall thereof provided with an inwardly-projecting radial flange, a plurality of pairs of strengthening members secured in the cavity of each section with the outer portions of each member of each pair fashioned to coact with the inner faces of each section and each member provided with an inwardly-extending integral arm secured to one of the flanges of the section in which it is placed, said members being disposed in pairs and with the members of each pair opposite to each other, a sectional ring within said core, the sections of which are secured to the inner ends of a portion of the arms of said strengthening members and adapted to hold said core sections temporarily in place, and means to separate the inner ends of said strengthening members to spring the side walls of the core sections apart during the vulcanizing operation.

3. A core comprising a plurality of segment-shaped sections adapted when assembled to form an annulus, said sections being of tubular formation and each side wall thereof provided with an inwardly-projecting radial flange, a plurality of pairs of strengthening members secured in the cavity of each section with the members of each pair opposite to each other and each member provided with an inwardly-extending integral arm secured to one of the flanges of the section in which it is placed, the inner face of each arm being provided with a projecting pin and with an opening spaced therefrom, the pin on one member of each pair being disposed opposite to the opening in the opposing member and adapted to be received therein, said pins adapted to project beyond the outer faces of said arms when said core sections are assembled, and means to engage the projecting ends of said pins to force the opposing faces of said arms away from each other to spring the side walls of the core sections apart during the vulcanizing operation.

4. A core comprising a plurality of segment-shaped sections adapted when assembled to form an annulus, said sections being of tubular formation and each side wall thereof provided with an inwardly-projecting radial flange, a plurality of pairs of strengthening members secured in the cavity of each section with the members of each pair opposite to each other and each member provided with an inwardly-extending integral arm secured to one of the flanges of the section in which it is placed, the inwardly-extending arms of said strengthening members each provided with a projecting pin and an opening the pins and openings of the opposing members being reversely disposed to permit the pins of one member to be received in the openings in the opposing member, said pins adapted to project through said arms when said arms are in contacting engagement, a sectional ring within said core for holding the sections temporarily in position during the formation of the core, said pins adapted to be forced laterally by engagement with the mold sections during the vulcanizing of the tire shoe to spring the side walls of the core sections apart for compressing the tire shoe held by said mold members.

In testimony whereof I have hereunto set my hand.

VICTOR L. COX.